US005247729A

United States Patent [19]

Carmichael

[11] Patent Number: 5,247,729
[45] Date of Patent: Sep. 28, 1993

[54] WREATH-MAKING MACHINE

[75] Inventor: Thomas Carmichael, Traceytown, Wash.

[73] Assignee: Callison's Inc., Seattle, Wash.

[21] Appl. No.: 883,217

[22] Filed: May 14, 1992

[51] Int. Cl.$^5$ ............................................. B23P 11/00
[52] U.S. Cl. .................................. 29/243.5; 29/283.5; 57/9; 100/26; 100/32
[58] Field of Search ................. 29/771, 779, 780, 788, 29/819, 820, 283.5, 243.5, 243.517; 57/3, 6, 9; 72/93; 100/12, 16, 26, 31, 32

[56] References Cited

U.S. PATENT DOCUMENTS

| 2,634,532 | 4/1953 | Englert | 100/12 |
| 3,250,209 | 5/1966 | Gage et al. | 100/26 |
| 3,428,096 | 2/1969 | Krylov | |
| 4,277,885 | 7/1981 | Scudder | 29/780 |
| 4,534,817 | 8/1985 | O'Sullivan | |
| 4,655,264 | 4/1987 | Dilley | 100/31 |
| 5,080,939 | 1/1992 | Eheler et al. | 493/958 |

FOREIGN PATENT DOCUMENTS

| 470138 | 1/1929 | Fed. Rep. of Germany | 100/26 |
| 1204484 | 1/1960 | France | 29/243.517 |
| 2137582 | 10/1984 | United Kingdom | |

Primary Examiner—P. W. Echols
Assistant Examiner—David P. Bryant
Attorney, Agent, or Firm—Pollock, Vande Sande & Priddy

[57] ABSTRACT

An apparatus for manufacturing a wreath from a plurality of elongated objects, such as boughs by securing the boughs to a frame with a securing member such as a wire.

10 Claims, 6 Drawing Sheets 5,247,729

WREATH-MAKING MACHINE

FIELD OF THE INVENTION

The present invention relates to an apparatus to wrap a securing member such as a wire about a frame and a plurality of elongated objects, such as tree boughs, to make a wreath and a method of making a wreath.

BACKGROUND OF THE INVENTION

Wreath-making is a lengthy, multi-step process requiring much manual labor. To begin the wreath-making process, one must select the proper boughs to be used. The boughs must then be arranged in the desired manner to form an attractive wreath and then must be bound together. To accomplish the binding, a plurality of strings or wires must be tied at many points around the wreath to secure the boughs in place.

Methods have been developed to simplify or automate the wreath-making process in different ways. For example, to assist in the wreath-making process, wire frames have been developed. These have partially simplified the wreath-making process by relieving the wreath maker of the task of deciding where to put the boughs to create the desired shape. Using such a frame, the boughs for the wreath are placed on the frame and secured to it. Although simplifying the wreath-making process somewhat, such frames still require the wreath maker to manually collect the boughs to be used, to gather the boughs together, and tie the boughs to the frame.

In a commercial setting, the labor intensive wreath-making process is costly and limits the output of a wreath maker. To make a wreath using a wire frame requires the securing of the boughs with approximately 45-50 wire ties. To secure the boughs to the frame, the wreath maker must apply about 28-30 pounds of pressure to each wire. The average wreath maker makes 40 wreaths each day, thus requiring the application of this pressure anywhere from about 1800 to 2000 times each day. As a result, injuries including, carpal-tunnel syndrome, muscle fatigue, and other injuries to shoulders, arms and hands are common to workers in the wreath making industry. Due to the nature of the work involved in wreath-making, the process has not heretofore lent itself to automation. The present invention eliminates all such existing problems inherent to wreath making.

SUMMARY OF THE INVENTION

Among the objects of the present invention is to provide a device to automate the wreath-making process and thereby increase the productivity of, and reduce injury, to workers making wreaths.

A further object of the present invention is to provide a device which will bind together the boughs making up a wreath.

An additional object of the present invention is to provide a device to secure boughs making up a wreath to a wreath-supporting frame.

A still further object of the present invention is to minimize the amount of time required to produce a wreath by reducing the handling and manipulating of the boughs.

Yet another object of the present invention is to provide an efficient method of making a wreath.

The above and other advantages of the present invention are achieved by the structure and method described below.

In accordance with the present invention there is provided a an apparatus for manufacturing a wreath from a plurality of elongated objects such as boughs. Holding means supports a stack of boughs on a frame, at least substantially encircling the boughs and positioning them in a preselected position relative to the frame. The frame is configured to approximately the dimensions of the finished wreath. Guide means supports and guides a length of wire to an encircling position about the boughs and frame. The wire is secured to the frame so as to tightly hold the boughs in a relatively fixed position in relation to the frame.

The present invention also provides a method, of making a wreath by securing boughs to a wreath-supporting frame with securing wire.

DETAILED DESCRIPTION OF THE PREFERRED EMBODIMENTS

Figure 1:
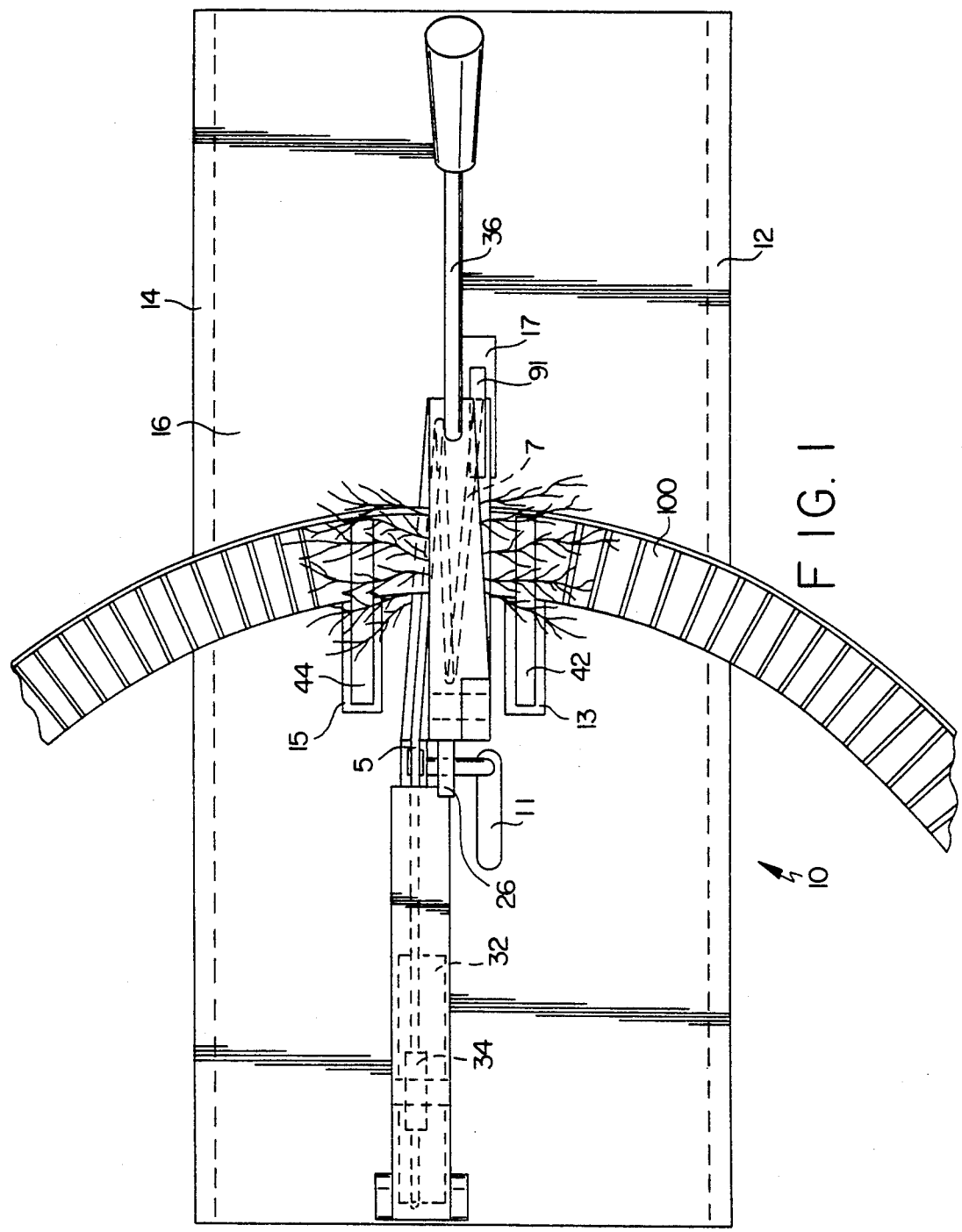
FIG. 1 is an overhead view of the wreath-making machine of the present invention.

The present invention is directed to an apparatus for automating the wreath-making process. Preferably, the present invention provides means for securing a plurality of elongated members, such as boughs, to a supporting frame. As shown in FIG. 1, the wreath-making apparatus of the present invention may be preferably contained within a housing 10 which may include a base plate 16 with downwardly extending side walls 12 and 14 attached thereto.

Figure 2:
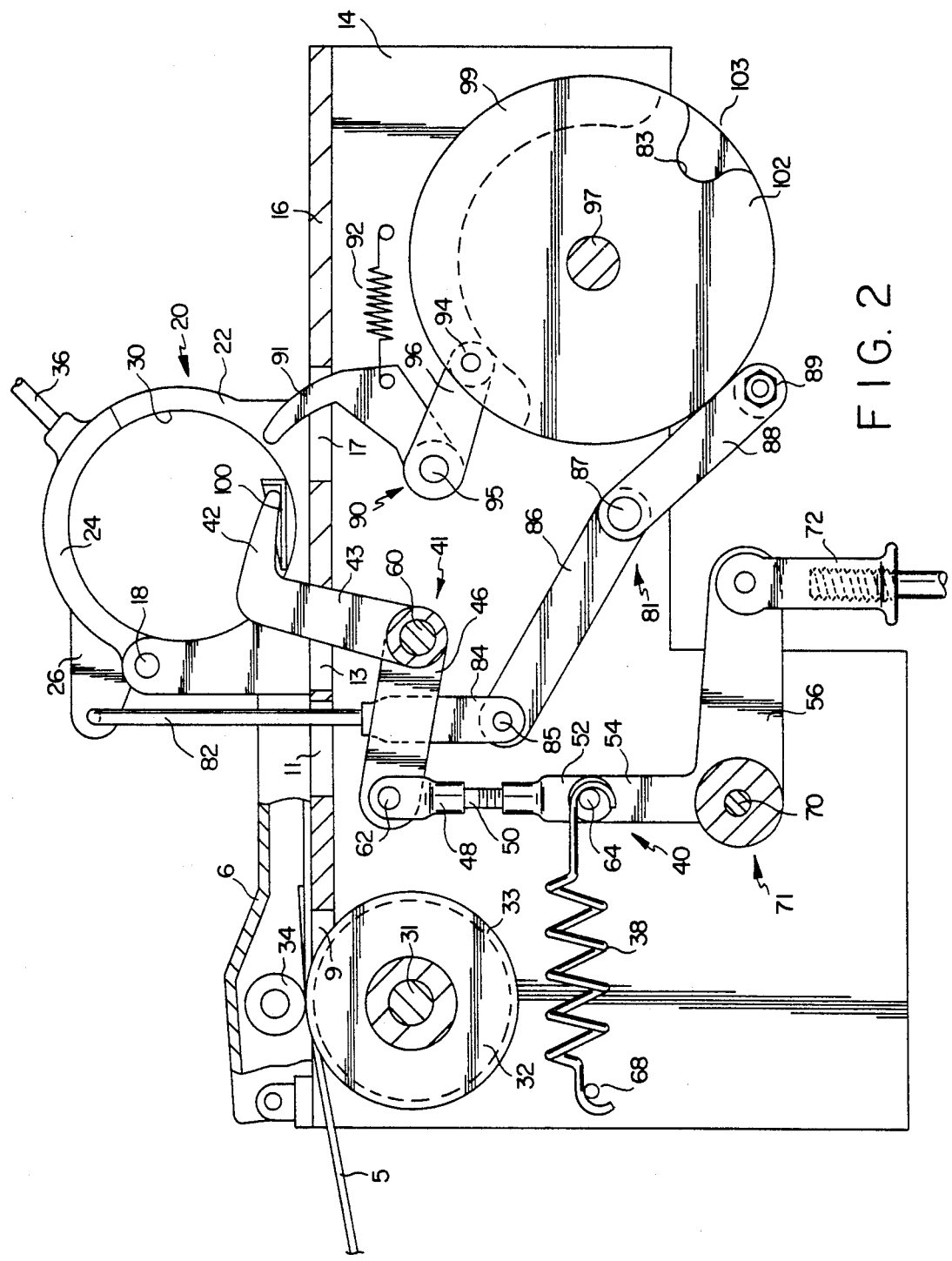
FIG. 2 is a cut-away view of a portion of the internal structure of the present invention.

In one preferred embodiment shown in FIG. 1, the boughs are secured to a wreath-supporting frame 100. During the process of advancing the securing member around elongated members which will be secured to the wreath-supporting frame, the wreath-supporting frame is immobilized by a wreath-supporting frame clamp means 40 as best seen in FIGS. 1 and 2. The embodiment of the wreath-supporting frame clamp shown in FIGS. 1 and 2 the frame clamp means 40 may include a Z-shaped member 41 located under base plate 16 of the wreath-making machine. The Z-shaped member 41 preferably includes teeth 42 and 44 which extend through passages 13 and 15 formed in base plate 16 to engage the surface of wreath-supporting frame 100. FIG. 2 shows a side view of tooth 42 of wreath-supporting frame clamp means 40 engaging that portion of wreath-supporting frame 100 which is parallel to the surface of base plate 16. The wreath-supporting frame clamp may have any shape which allows the wreath-supporting frame to be immobilized while elongated members are secured to it.

When the wreath-supporting frame clamp is of the shape shown in FIGS. 1 and 2, a central segment 43 of Z-shaped member 41 of wreath-supporting frame clamp means 40 will extend down through base plate 16 where it is connected to lower segment 46 of Z-shaped member 41. The Z-shaped member 41 is pivotally mounted in the housing by a pivot rod 60. To reach an open position, teeth 42 and 44 are moved up and away from the upper surface of wreath-supporting frame 100. Lower segment 46 is pivotally joined by a pivot rod 62 to a clevis rod end 48 which is adjustably attached to the member 52 by a threaded rod 50. An "over-center" or "dead center" linkage is formed when hinge pin 64 connects member 52 to a member 54 which in turn is pivotally connected to clamp counter shaft 71 comprising an L-shaped piece pivotally anchored to the wreath-making machine at a wreath-supporting frame clamp counter shaft pivot rod 70. A strong spring 38 may preferably be connected to hinge pin 64 cause teeth 42 and 44 to maintain a tight grip on wreath-supporting frame 100 during the bough securing process. Spring 38 may be secured to side wall 14 of the wreath-making machine with a bolt 68 or other similar securing means.

In one preferred embodiment shown in FIG. 2, the wreath-supporting frame clamp is preferably actuated by a foot pedal. The free end of a wreath-supporting frame clamp countershaft arm 56 is connected to a foot pedal release rod 72. The other end of the foot pedal release rod is connected to a foot pedal (not shown). Stepping on the foot pedal causes foot pedal release rod 72 to move downwardly, rotating wreath-supporting frame clamp counter shaft 71. As countershaft 71 pivots about wreath-supporting frame clamp counter shaft 70, arm 54 pulls on wreath-supporting frame clamp link member 52 which pulls lower segment 46 of Z-shaped member 41, causing the wreath-supporting frame clamp means 40 to pivot and teeth 42 and 44 to disengage from wreath-supporting frame 100.

Although the embodiment shown in FIG. 2 includes a foot pedal actuated wreath-supporting frame clamp, a variety of other means for actuating the wreath-supporting frame clamp means could be included in the present invention. For example, rather than being moved by the operator's foot, the wreath-supporting frame clamp might be actuated by a hand lever, therefore necessitating the alteration of the design, configuration, connection, mounting, and operation of the wreath-supporting frame clamping means.

In one preferred embodiment, shown in FIG. 2, means for containing the wreath-supporting frame 100 and elongated members 150 during the process of advancing and tightening the securing member includes a two part yoke 20 attached to the top surface of base plate 16. As seen in the embodiment shown in FIG. 2, yoke 20 has a substantially circular inner cross section made up of an upper yoke portion 24 and a lower yoke portion 22. Lower yoke portion 22, which has an inner surface 30 with a substantially semicircular cross section is secured to base plate 16.

Figure 3:
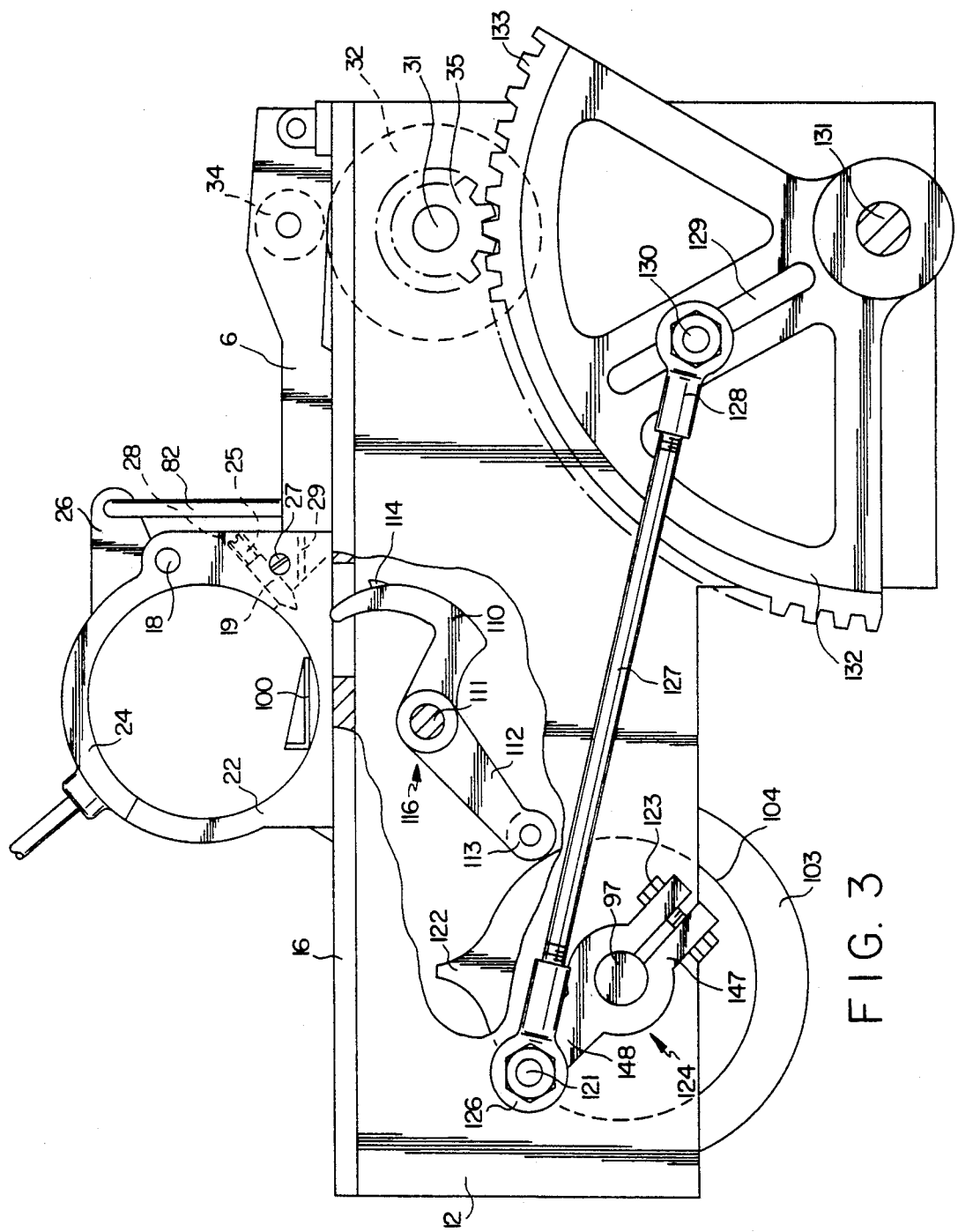
FIG. 3 is a side view, partially cut-away, of the left side of the present invention.

As a means of introducing the securing member to the interior of the yoke, the present invention may, as shown in FIG. 3, preferably include toward the rear of the lower yoke portion, i.e., that side away from the operator, a wire feed hole 29 through which a securing wire is fed. As a means of cutting off any surplusage of said member, a passage 28 formed in the lower portion 22 of the yoke in the vicinity of and above the wire feed hole 29 can contain a wire cut-off knife 19 which is inserted in the passage 28 far enough to allow the wire to be forced against it as described below. In this embodiment, an adjusting screw 25 adjusts the position of wire cut-off knife 19 and a locking screw 27 presses against cut-off knife 19 so as to maintain its position during the operation of the machine as the wire is forced against it.

In one preferred embodiment upper yoke portion 24 may be pivotally attached to lower yoke portion 22 with a pin 18 to move between an open and a closed position. Upper yoke portion 24 may preferably include a substantially semicircular inner cross section complementary to that of lower yoke portion 22 so that the interior of the yoke has a circular cross section when in the closed position. Guiding means for supporting and guiding a length of wire to an encircling position about the boughs and frame included in the present invention may be provided by a groove formed on the inner surfaces of the upper and lower yoke portions. In this embodiment of the present invention, when both ends of the upper yoke portion engage both ends of the lower yoke portion as shown in FIG. 2, a groove 7 (see FIGS. 1 and 8) formed on the inner surface of both halves of the yoke 20 guides the wire as it is fed around bough 150 and the wreath-supporting frame 100.

In one preferred embodiment, an operating handle 36 may be attached near the free end of upper yoke portion 24 to allow the yoke halves to be brought into contact. Guiding means to guide the wire into the yoke may include a wire guide as seen in FIG. 2. The wire guide 6 may preferably be attached to the base plate 16 abutting the rear of the lower yoke portion 22. The wire guide may be included in present invention as guiding means to guide the wire to the yoke. The wire guide may be pivotally attached to base plate 16 so that the wire guide 6 may be lifted up, exposing the wire advancing mechanism, the details of which will be discussed below. Wire guide 6 is placed over the opening as seen in FIG. 1 and in cross section in FIGS. 2 and 3 on top of the base plate 16.

As a means of activating the motor and commencing the process of securing the boughs to the wreath-supporting frame, a series of connections is made between the moveable upper yoke portion and the means for securing the securing member to the frame as well as the motor activating switch. In a preferred embodiment as shown in FIG. 2, the upper portion 24 of the yoke has a tab 26 attached to it above pin 18. Attached to tab 26 is a trip rod 82 which passes through an opening 11 in base plate 16. Below the base plate 16, trip rod 82 is joined to a trip rod clevis 84, the lower end of which is pivotally attached to a trip arm segment 86 of trip arm 81 by a pin 85.

Figure 9:
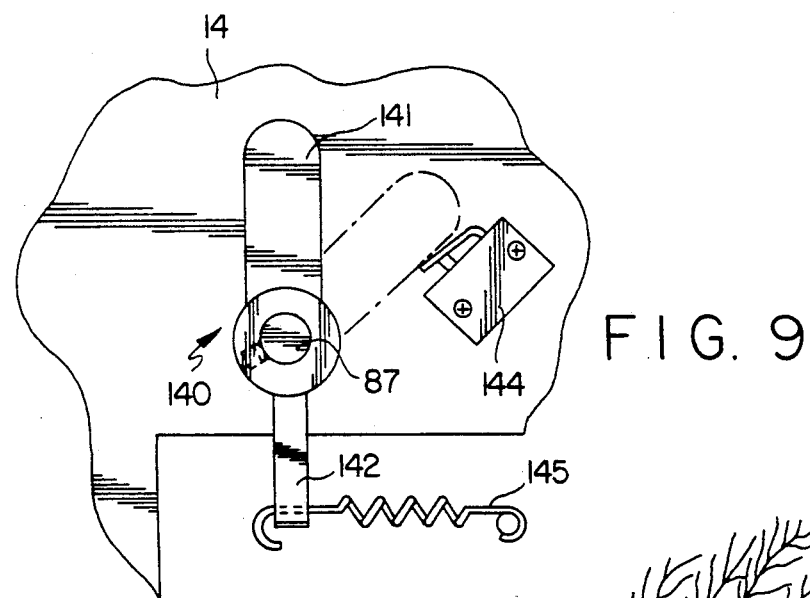
FIG. 9 is a close-up view of the motor-activating switch of the present invention.
Figure 10:
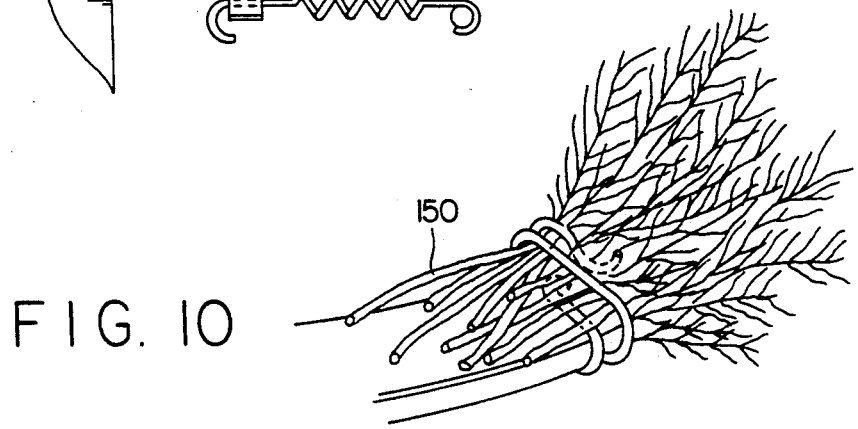
FIG. 10 is a view of the wreath-supporting frame with the boughs secured thereto by securing wire.

Preferably, the present invention is powered by an electric motor; in an alternative embodiment, the apparatus is activated by hand. In the embodiment shown in FIG. 2, the means to engage the motor includes trip arm 86 may preferably be attached to a trip arm pivot rod 87 which extends through side wall 14 and is connected to a motor switch arm 140 as shown in FIG. 9. Motor switch arm 140 may be made up of two portions, a motor switch engagement arm 141 and a lower motor switch arm 142. A motor switch 144 may be placed on the right side wall 14 a distance away from the trip arm pivot rod 87 no greater than the length of the motor switch engagement arm 141. A spring 145 attached to the lower motor switch arm 142 can be used to maintain motor switch engagement arm 141 out of contact with motor switch 144 when the wreath-making machine is not operating. Motor switch 144 is operatively connected to a motor 146 which is mounted on the outside of side wall 14 and powers the operation of the machine.

At its other end, trip arm pivot rod 87 in the embodiment shown in FIG. 2 is connected to trip arms 86 and 88 comprising segment 81. Arm 88 extends from the trip arm pivot rod 87 to a trip arm roller 89. Roller 89 is engaged by the surface of an indexing trip cam 102 attached to cam shaft 97 which controls the operation of the present invention.

Cam shaft 97 is driven by motor 146 and may be connected to motor 146 by any means for driving a cam shaft, such as a flexible coupling. Cam shaft 97 is placed between and extends beyond both side wall 12 and side wall 14. Roller bearings (not shown) or other means may be placed in the wall openings assist the movement of the cam shaft.

Actuating means are provided for advancing the securing member, activating the means for securing the securing member to the wreath-supporting frame. The actuating means preferably includes cams mounted on the cam shaft. In one preferred embodiment, three cams, 102, 103, 104 attached to cam shaft 97 activate the mechanism of the wreath-making machine. The cams may be placed in any order on the shaft but the rotational positions of the cams around the cam shaft is critical to the timing of the functions of the present invention.

Figure 4:
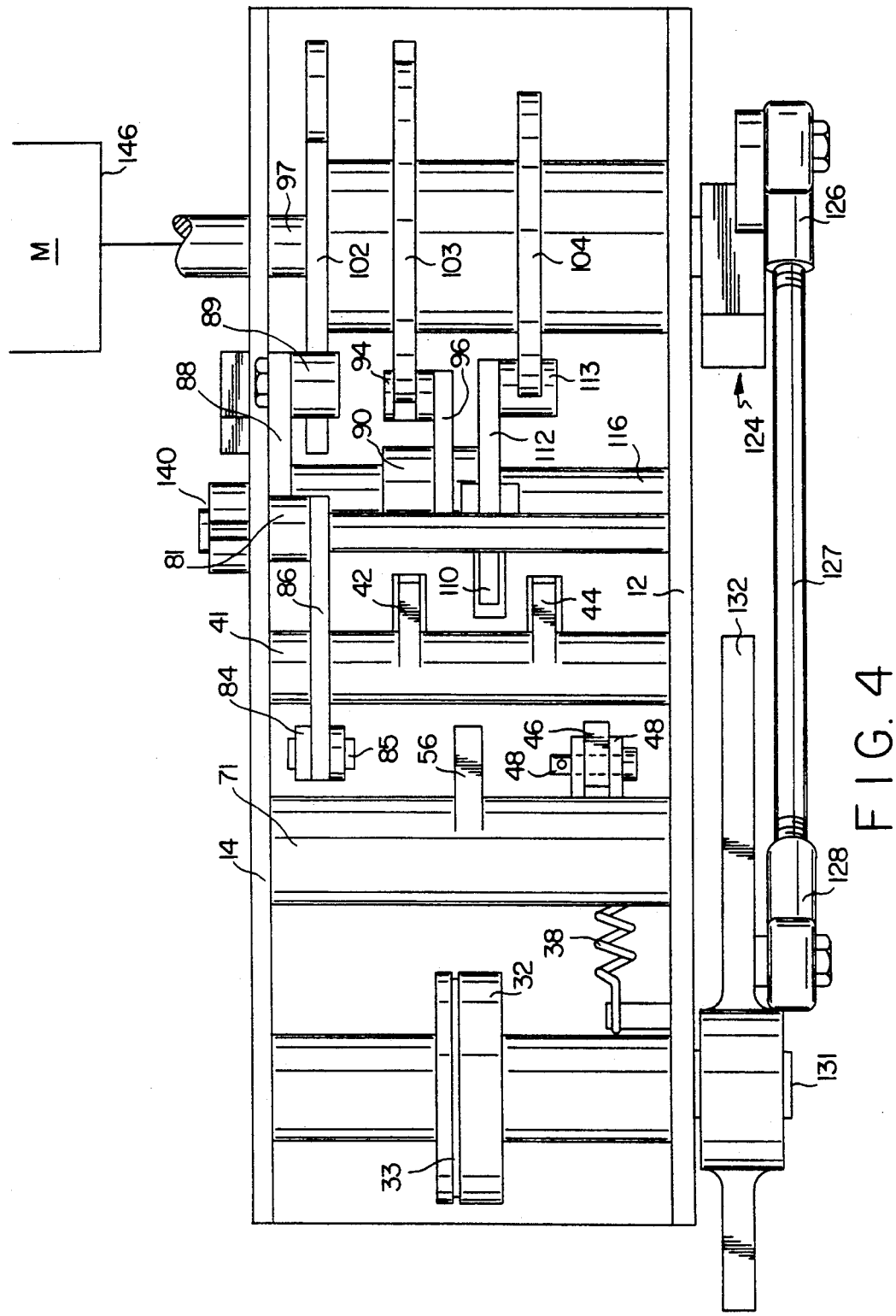
FIG. 4 is a view of the present invention from underneath.

The first cam closest to the motor in a preferred embodiment as shown in FIGS. 2 and 4 is indexing trip cam 102. A recess 83 in indexing trip cam 102 is slightly larger than trip arm roller 89 which is at the end of trip arm 81 and is moved out of recess 83 when yoke 20 is moved into the closed position.

The second cam away from the motor as shown in FIGS. 2 and 4 is a clinch cam 103 which has a recess 99 extending over approximately one half of its circumference. This recess is shown in FIG. 2 as a dotted line in the interior of indexing trip cam 102. The depth of the recess is sufficient to permit roller 94 of a first clinch finger 90 to fit inside recess 99 so that first clinch finger 90 is retracted during that part of the cycle when the wire is being advanced into the helical groove of the yoke, as shown in FIG. 2.

The means for securing the wire to the frame may include a first clinch finger. As seen in cross section in FIG. 2, one preferred embodiment of the first clinch finger 90 may include a Z-shaped member pivotally mounted at a first clinch finger pivot 95. A top segment 91 of the Z-shape extends through a passage 17 in base plate 16. A first clinch finger return spring 92 attached to the middle segment of the Z-shape of first clinch finger 90 maintains first clinch finger 90 in a retracted position as shown in FIG. 2. As means for actuating the finger 90, a roller 94, mounted on the lower segment 96 of the Z-shape, below first clinch finger pivot 95, is impacted on by first clinch cam 103.

The means for securing the securing member to the wreath-supporting frame may also include a clinch and cut-off finger 110 actuated by a clinch and cut off arm 116 and cam 104. In this preferred embodiment, the clinch and cut off cam is farthest away from the motor as shown in FIGS. 3 and 4, and controls the movement of a clinch and cut-off arm 116. Clinch and cut-off arm 116 preferably comprises an upper L-shaped finger segment 110 and a lower segment 112 connected together and pivotally mounted on a pin 111. A protrusion 122 on clinch and cut-off cam 104 acts upon a roller 113 of lower segment 112 of clinch and cut-off arm 116 as shown in FIG. 3. Protrusion 122 on the clinch and cut-off cam 104 is located relative to clinch cam 103 and indexing cam 102 so that clinch and cut-off finger 110 and first clinch finger 91 will both be in a retracted position as trip cam roller 89 falls into indexing trip cam recess 83 at the end of the cycle.

L-shaped segment 110 contains a finger which will clinch and cut-off the securing member. On the upper side of clinch and cut-off finger 110 is a wire cut-off knife 114 which will act on the securing wire in conjunction with the stationary wire cut-off knife 19, located in the lower yoke portion 22, as the clinch and cut-off arm 116 is moved by clinch and out-off cam 104.

When in a retracted position, finger 110 points toward base plate 16. Finger 110 is arcuately shaped so as to bend the securing wire over wreath-supporting frame 100 and then down toward the wreath-supporting frame surface. As the clinch and cut-off finger 110 travels up to bend the securing wire, the wire is severed by the yoke wire cut-off knife 19 and wire cut-off knife 114.

Cam shaft 97 may extend beyond the side wall 14 as shown in FIGS. 3 and 4. Means for controlling the movement of the securing member may be attached to cam shaft 97 on the outside of the side wall 14, as can be seen in FIGS. 3 and 4. The means to control the movement of the securing member movement may include a wire feed crank 124 comprised of a U-shaped portion 147 which encloses cam shaft 97 and an arm 148 attached to the U-shaped portion. The U-shaped portion 147 of wire feed crank 124 extends away from the cam shaft 97 on the opposite side from the extension 148. Wire feed crank 124 is secured to the cam shaft by a bolt 123 which passes through holes formed in the U-shape. When the nut is tightened on the bolt, the arms are brought closer together, maintaining the wire feed crank 124 stationary on cam shaft 97.

Attached to the arm 148 on the wire feed crank 124 is a wire feed rod 127, which is provided with rod end bearings 126 and 128 attached to its ends. Rod end bearing 126 is attached by a bolt 121 protruding through the arm 148 of the wire feed crank, and rod end bearing 128 is attached by a bolt 130 through the feed drive gear slot 129. A feed drive gear 132 is mounted on a feed drive gear shaft 131.

Feed drive gear 132 drives the feed driven gear 35 which is mounted on a feed shaft 31. Also mounted on feed shaft 31 is the feed roll 32, which contacts a pressure roll 34. The wire used to secure the boughs to wreath-supporting frame 100 travels between the pressure roll 34 and the feed roll 32. Pressure roll 34 and feed roll 32 are close enough together so that rotation of the feed roll 32 advances the wire between the two rolls.

Operation of the Wreath-making Machine

The embodiment of the apparatus as described above operates to secure at least one bough 150 to a wreath-supporting frame 100 as described below. The operator sits in front of the machine at the side of base plate 16 opposite the side where the wire guide is attached. When the machine is not in the process of securing boughs, as seen in FIG. 9, spring 145 holds roller 89 in the indexing slot 83 and the upper yoke portion 24 in the open position so the operator may place the frame and/or boughs therein.

Figure 5:
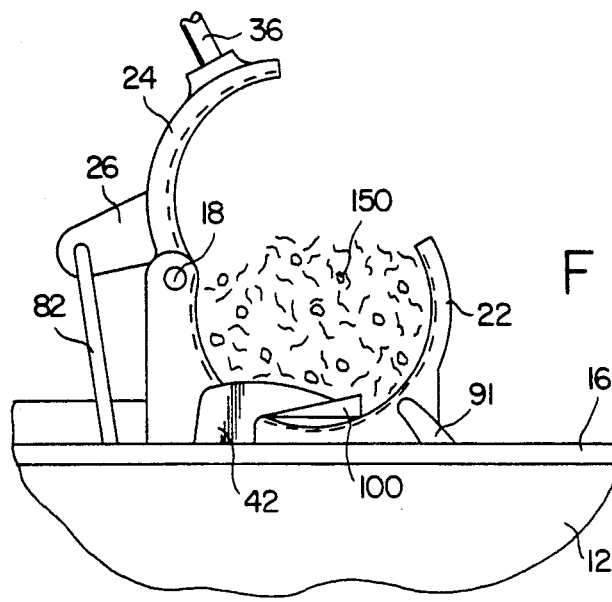
FIG. 5 is a view of the present invention at the start of the bough-securing process.

Prior to placing bough 150 and the wreath-supporting frame 100 into the wreath-making machine of the present invention, the operator places her foot on a foot pedal (not shown), moving the wreath-supporting frame clamp counter shaft 71 clockwise as seen in FIG. 2. As counter shaft 71 rotates, it pulls on member 52 and clevis rod end 48. Clevis rod end 48 transmits the force to the wreath-supporting frame clamp 41 causing it to rotate counter clockwise as seen in FIG. 2 to cause wreath-supporting frame clamp 41 to move to an open position, away from the surface of base plate 16. The operator then places the wreath-supporting frame 100 in the bottom of the lower yoke portion 22 as seen in FIG. 2. Next, the operator lifts her foot off the foot pedal so that the wreath-supporting frame clamp 41 will be caused to rotate back clockwise by the spring 38, gripping the wreath-supporting frame and holding it stationary for the bough securing process to take place. Bough 150 is then placed within bottom portion 22 of the open yoke. At this point the upper yoke portion 24 is still in the open position as shown in FIG. 5 with the operating handle 36 oriented so as to point away from the operator.

To begin the securing process the operator, after placing the wreath-supporting frame and boughs in the lower yoke portion, pulls the operating handle 36 toward herself so that upper yoke portion 24, which pivots at pin 18, approaches the lower yoke portion 22. The interconnected nature of the trip rod 82, the ring clamp counter shaft 71, and member 52 is best seen in FIG. 2. As the operating handle is pulled towards the operator, the two yoke portions come together to form a closed circle to fully contain the boughs and complete the helical groove, through which the securing wire will travel, formed on the inside surface of the yoke halves.

As the upper yoke portion 24 moves into the closed position, trip rod 82, which is connected to upper yoke by tab 26, moves upward to the position shown in FIGS. 2 and 3. Trip rod 82 which, through the yoke arm clevis rod end 84, is attached to trip arm 81 and pulls upwardly on trip arm 81 as yoke 20 is closed. The upward force on the end of trip arm 81 causes it to rotate about pivot 87. As trip arm 81 rotates, roller 89 moves out of recess 83 in trip cam 102.

As trip arm 81 rotates due to the force applied by closing the yoke, motor switch arm 140 which is also connected to the pivot rod 87 will travel so as to apply pressure to the motor switch 144. As operating handle 36 completes its travel, yoke 20 closes, roller 89 moves away from the indexing cam 102 and switch arm 140 engages the motor switch, activating the motor 146. With the yoke 20 and wreath-supporting frame clamp 43 in proper position and the roller 89 out of the cam, motor 146 can operate turning cam shaft 77, commencing the process of securing the boughs to the bough support by activating other elements of the machine and advancing the wire so as to secure the boughs.

Motor 146 is mounted on side wall 14 with a motor mount (not shown) and the drive shaft of the motor is coupled to cam shaft 97 via a coupling (not shown). The motor rotates cam shaft 97 and, subsequently, activates the other components of the machine.

As the motor is activated, cam shaft 97 rotates, causing the wire feed crank 124 to turn. As seen in FIG. 3 the wire feed crank 124 rotates in a clockwise direction. As feed crank 124 turns, it causes the wire feed rod 127 to advance toward teeth 133 of feed drive gear 132. As wire feed rod 127 moves, attached feed rod bolt 130 pushes against the slot 129 in the wire feed drive gear 132 and causes the feed drive gear 132 to move clockwise. Since the teeth of the feed drive gear engage the teeth of the feed driven gear 35 as the feed drive gear rotates clockwise, it causes the feed driven gear 35 to move counterclockwise. Rotation of feed driven gear 35 also rotates feed roll 32 since they are attached to the same shaft 31. Feed roll 32 abuts pressure roll 34, and therefore any movement of feed roll 32 rotates pressure roll 34 and subsequently moves wire 5, which is inserted between the feed roll and the pressure roll.

Figure 8:
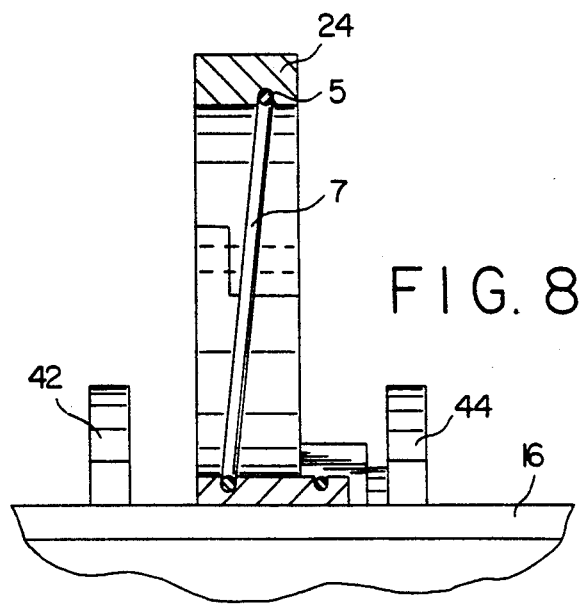
FIG. 8 is a sectional view showing the interior surface of the yoke of the present invention.

Wire 5 travels from underneath the base plate 16 where it is stored in a spool (not shown), up through an opening 9 in the base plate 16, between feed roll 32 and pressure roll 34, through the wire guide 6, and into the bottom portion 22 of the yoke 20. Once inside the yoke, the wire travels in helical groove 7 formed on the inside surface 30 of both the upper and lower portions of the yoke as seen in FIGS. 1 and 8. When the yoke halves are closed together, the groove is continuous. The slot 129 allows for the adjustment of the wire length when the machine is first set up.

Figure 6:
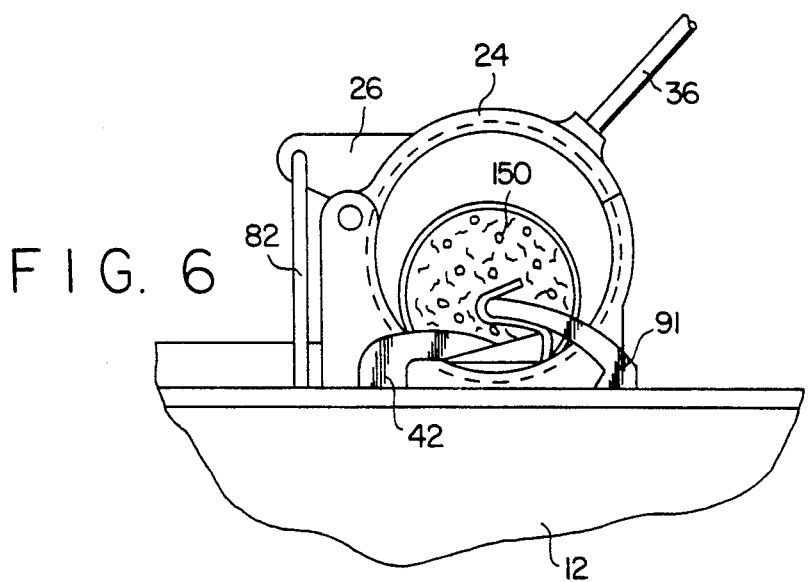
FIG. 6 is a view of the present invention at an intermediate point in the bough securing process.

After the wire has travelled over the complete path of the groove, clinch finger 91 will cause the wire to bend over the wreath-supporting frame and the boughs as shown in FIG. 6. After the first bend of the wire is made, the wire feed crank 124 has travelled far enough around its travel path to cause the wire feed rod 127 to pull against the feed drive gear 132 reversing its direction. This reversal of the feed drive gear 132 causes the feed driven gear 35 to reverse its motion, causing the feed roll 32 and therefore the pressure roll 34 to reverse directions, thereby causing the wire to be pulled thus tightening it within yoke 20. If the tension in the wire increases above a predetermined point, the wire will slip between the pressure and feed rolls until they cease to turn and reverse directions.

The lower segment 96 of the first clinch finger 90 is impacted on by the first clinch cam 103 so that the finger is maintained in an extended position until the wire is fully retracted and the securing process is completed. Maintaining the first clinch finger so extended, with the resulting force on the securing wire, is necessary to allow sufficient pressure to be applied to the securing wire by the reversing feed mechanism to tighten the wire about the boughs with sufficient force.

Figure 7:
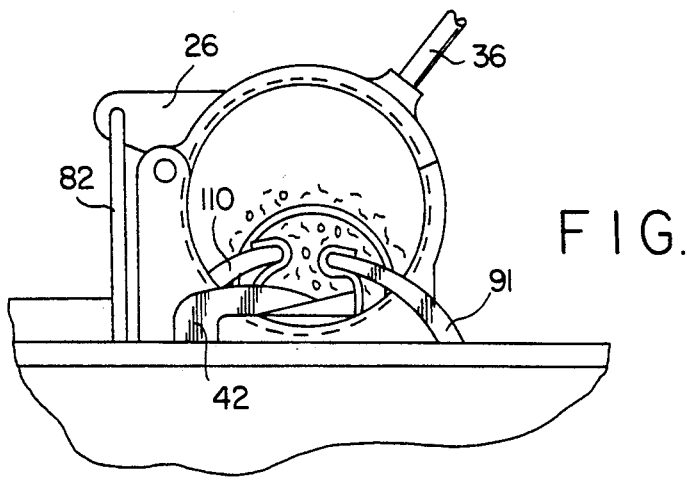
FIG. 7 is a view of the present invention at the completion of the bough securing process.

After the wire has retracted as far as it will go, clinch and cut-off finger cam 104 causes clinch and cutoff finger 110 to move into its extended position as seen in FIGS. 3 and 7. As clinch and cut-off finger 110 moves into its extended position it moves the wire upward to impact the wire cut-off knife 19 in lower yoke portion 22. Clinch and cut-off finger 110 continues on its path, causing the wire to be cut by the two knives 19 and 114. During this process, the end portion of the wire is caused to bend backward. The last clinch and cutoff finger then continues on its path to become fully extended, bending the wire over the frame and into the branches as shown in FIG. 7.

Upon completion of the bough securing process, clinch and cutoff finger 110 and first clinch finger 91 are caused to retract as the cam shaft completes its revolution. The completion of the revolution of the cam shaft brings the first cam 102 into position so that roller 89 may return to its recess 83 in the first cam. The return of roller 89 causes the trip arm 81 to rotate, causing the trip arm pivot 87 to rotate, and causing the switch arm 140 to release its pressure upon the motor switch 144, thereby turning off the motor. A brake on the motor (not shown) prevents it from continuing to turn. The rotation of the trip arm 81 causes the trip rod 82 to move downwardly thus opening the upper portion 24 of the yoke 20.

At this point, the operator can again step down on the foot pedal to release the wreath-supporting frame from the grip of the wreath-supporting frame clamp. The wreath-making machine is now in a position to allow the operator to rotatably advance the wreath-supporting frame, place additional boughs thereon, and initiate the securing process once again by pulling on the operating handle 36.

Boughs making up wreaths generally have a cut end and an end terminating in a bud. The first bough(s) will be placed upon the wreath supporting frame and secured substantially near the cut end. The next bough(s) to be secured to the wreath supporting frame will be oriented with the cut end(s) in the same direction as the first bough(s) with the foliage of the next bough(s) laid over the cut ends of the previously secured boughs so as to hide the cut end and securing wire from view. Boughs are continuously laid over each other as the wreath is made, much as shingles are placed on a roof. When boughs have been secured around most of the frame, the non-cut, bud terminating ends of the first bunch of boughs are lifted up and the cut ends of the final bunch to be secured are placed underneath thereof and secured. Securing the boughs in this overlapping way conceals all of the securing wires from view.

We claim:

1. Apparatus for manufacturing a wreath from a plurality of boughs comprising in combination:
   holding means for supporting a stack of boughs on a frame configured to approximately the desired dimensions of the wreath, said holding means being effective to at least substantially encircle said stack of boughs and position said stack in a preselected position relative to said frame;
   guide means for supporting and guiding a length of wire to an encircling position about said plurality of boughs and also about said frame;
   means for wrapping said wire about said frame so as to secure said plurality of boughs in a fixed relation to said frame.

2. The apparatus according to claim 1, wherein said holding means includes:
   a yoke including a lower yoke portion and an upper yoke portion pivotally mounted on said lower yoke portion and movable between an open position for inserting said plurality of boughs within said yoke, and a closed position for holding said boughs and frame within said yoke;
   and a frame clamp to engage a surface of said frame.

3. The apparatus according to claim 2, wherein said guide means includes on said yoke, a substantially circular inner surface including a helical groove formed therein for passage of said wire, such that in said closed position, said helical groove is continuous and the wire is advanced into the helical groove and around said boughs and frame placed within said yoke.

4. The apparatus according to claim 1, wherein said wrapping means includes means for bending a first end of said wire over an edge of said frame and for holding said first end of said wire against said edge of said frame, means for applying a pulling force to a second end of said wire so as to tighten the wire about the boughs and frame, and means for cutting the wire, and means for bending the cut end over a second edge of said frame simultaneously with said tightening of said wire.

5. The apparatus according to claim 1, wherein said guiding means includes a pressure roll and an abutting feed roll, said feed roll being mounted on a drive shaft on which a feed driven gear is also mounted, the teeth of said feed driven gear being inter-connected with the teeth of a feed drive gear, said feed drive gear being actuated by a wire feed rod, said feed rod being actuated by a wire feed crank connected to a cam shaft.

6. The apparatus according to claim 1, including:
   a housing comprising a base plate having an upper surface;
   a yoke including a lower yoke portion affixed to said upper surface of said base plate, and an upper yoke portion pivotally mounted on said lower yoke portion and movable between an open position for inserting said boughs within said yoke, and a closed position for holding said boughs in place within said yoke;
   frame clamp means mounted on said housing for maintaining said frame in a fixed position;
   means for advancing and guiding said wire;
   means mounted on said housing for tightening said wire about said frame, said tightening means including a clinch finger for bending a free end of said wire over an edge of said frame and boughs after said wire has been advanced into said yoke, a wire feed reversing means for tightening the wire about the frame and boughs, and a clinch and cut-off finger for cutting the wire and bending the cut end of said wire around another edge of the frame;
   means for actuating the wire advancing means, the clinch finger, the wire reversing means, and the clinch and cut-off finger.

7. The apparatus according to claim 1, wherein said apparatus further comprises means for maintaining said frame substantially stationary while said wire is wrapped about said boughs and said frame.

8. The apparatus according to claim 7, wherein said means for maintaining said frame substantially stationary includes a frame clamp.

9. An apparatus for manufacturing a wreath from a plurality of elongated objects comprising:
   supporting means for supporting a plurality of elongated members and a frame configured to approximately the desired dimensions of the wreath to which said elongated members are to be fixed with a securing member, the securing member having a first end;
   containing means for containing the elongated members and frame;
   guiding means for guiding the securing member to an encircling position about the elongated members and the frame;
   wrapping means for wrapping the securing member about the frame;
   tightening means for tightening the securing member about the elongated members and about the frame;

and cutting and bending means to sever the securing member near the frame and to bend the severed end of the securing member over the frame.

10. An apparatus for manufacturing a wreath from a plurality of boughs comprising in combination:

holding means for supporting a stack of boughs on a frame configured to approximately the desired dimensions of the wreath, said holding means being effective to at least substantially encircle said stack of boughs and position said stack in a preselected position relative to said frame;

guide means for supporting and guiding a length of wire to an encircling position about said plurality of boughs and also about said frame;

means for wrapping said wire about said frame so as to secure said plurality of boughs in a fixed relation to said frame, said wrapping means including means for bending a first end of said wire over an edge of said frame and means for bending a second end of said wire over said frame.

* * * * *